United States Patent [19]

Idelson et al.

[11] 4,151,667
[45] May 1, 1979

[54] NOVEL I.D. CARDS

[75] Inventors: Elbert M. Idelson, Newton Lower Falls; Thomas Raphael, Winchester; Herbert N. Schlein, Beverly, all of Mass.

[73] Assignee: Polaroid Corporation, Cambridge, Mass.

[21] Appl. No.: 755,682

[22] Filed: Dec. 30, 1976

[51] Int. Cl.² ............................................... G09F 3/02
[52] U.S. Cl. ............................................ 40/2.2; 283/7
[58] Field of Search .................. 40/2.2, 615; 283/7; 428/204, 323

[56] References Cited

U.S. PATENT DOCUMENTS

| | | | |
|---|---|---|---|
| 2,835,993 | 5/1958 | Whitehead | 40/2.2 |
| 3,279,826 | 10/1966 | Rudershausen et al. | 40/2.2 X |
| 3,477,156 | 11/1969 | Naito | 40/2.2 |
| 3,679,512 | 7/1972 | Macone | 40/2.2 X |
| 3,755,935 | 9/1973 | Annenberg | 40/2.2 |
| 3,758,970 | 9/1973 | Annenberg | 40/2.2 |
| 3,953,642 | 4/1976 | Forbes et al. | 428/204 |
| 3,967,022 | 6/1976 | Hasei | 428/204 X |

*Primary Examiner*—Louis G. Mancene
*Assistant Examiner*—Wenceslao J. Contreras
*Attorney, Agent, or Firm*—Louis G. Xiarhos; John P. Morley

[57] ABSTRACT

Laminated documents such as I.D. cards using a phosphorescent material as a verification or validation pattern.

28 Claims, 7 Drawing Figures

NOVEL I.D. CARDS

BACKGROUND OF THE INVENTION

1. The Field of the Invention

This invention relates to laminated documents such as I.D. cards and more particularly to security features for such documents.

2. Description of the Prior Art

Laminated documents such as I.D. cards essentially comprise a card or document usually containing information relating to the bearer and generally, a portion of the information is in the form of a photograph of the bearer. Normally, the card is protected by a plastic sheet material such as by lamination of the card to a plastic sheet material or, as is usually the case, by lamination of the card between plastic sheet materials. I.D. cards have many uses and their uses are increasing. For example, they may be used to establish a person's authorization to conduct certain activities (driver's licenses) or their authorization to have access to certain areas (employee I.D. cards) or their authorization to engage in credit transactions (I.D. credit cards). In view of their widespread uses, especially in commercial transactions, such as cashing checks, credit purchases, etc., it is important that the person relying on the I.D. card to identify the bearer have maximum assurance that the I.D. card has not been altered and/or that the I.D. card is not a counterfeit.

A great deal of ingenuity has been employed to provide this desired degree of assurance. For example, specialized adhesive systems and lamination techniques have been developed to prevent or discourage alteration of I.D. cards. These systems and techniques are designed to achieve a high degree of bonding efficiency between a surface of the card and any plastic sheet material bonded to it. Certain adhesive systems, for example, can provide what is known in the art as a "security seal". A "security seal" is best explained by describing what happens if an attempt is made to pull a plastic sheet material from the surface of a card bonded to the plastic. If a "security seal" exists, all or at least portions of the adhered surface will be removed from the card together with the plastic sheet material. Adhesives or adhesive systems which can provide "security seals" for I.D. card elements are described in such Patents as U.S. Pat. No. 3,582,439; U.S. Pat. No. 3,614,839 and in commonly assigned copending Applications Ser. No. 361,232 filed May 17, 1973 and Ser. No. 654,220 filed Feb. 2, 1976. All of these Patents and Applications are expressly incorporated here in their entirety.

Ideally, a "security seal" is designed to prevent alteration of or any further use of the card as well as any further use of the plastic adhered to it. Accordingly, a "security seal" is normally established between the information-bearing surface of the card or document and the plastic. Under such circumstances, removal of the plastic should also remove substantial portions of the information-bearing surface of the card to render the card unuseable for alteration purposes. Likewise, if extensive portions of the so removed information-bearing surface remain adhered to the plastic sheet material, the plastic cannot be reused without employing specialized techniques to remove the adhered portions. A "security seal" is considered to provide an excellent capability for preventing or effectively discouraging alteration of documents such as I.D. cards and they are employed extensively as a primary anti-alteration security feature in I.D. cards.

The counterfeiting of documents such as I.D. cards involving as it does the fabrication and issuance of I.D. cards by persons not authorized to do so presents additional and different security problems to the art. Perhaps the most effective way to prevent counterfeiting would involve strict control over the possession of the materials and equipment involved in the fabrication of I.D. cards. In most cases, however, this approach would be impractical and most likely impossible. For example, too many of the materials involved are commercially available and used in other applications. Instead, the art's response to the counterfeiting problem has involved the integration of "verification features" with I.D. cards to evidence their authenticity. The best known of these "verification features" involve signatures such as the signature of the one authorized to issue the I.D. card or the signature of the bearer. Other "verification features" have involved the use of watermarks, fluorescent materials, validation patterns or markings and polarizing stripes among others. These "verification features" are integrated with I.D. cards in various ways and they may be visible or invisible in the finished card. If invisible, they can be detected by viewing the feature under conditions which render it visible. Details relating to the use of "verification features" in I.D. cards can be found in such Patents as U.S. Pat. No. 2,984,030; U.S. Pat. No. 3,279,826; U.S. Pat. No. 3,332,775; U.S. Pat. No. 3,414,998; U.S. Pat. No. 3,675,948; U.S. Pat. No. 3,827,726 and U.S. Pat. No. 3,961,956.

All of the verification features discussed above have achieved a measure of success in preventing or discouraging counterfeiting. Duplication of these feature(s) apparently presents an obstacle or problem of sufficient difficulty to discourage would-be-counterfeiters. However, In certain respects, some features are considered to fall short in terms of the idealized performance characteristics desired. For example, signatures, validation marks or validation patterns may be duplicated by photographic techniques. Also, "verification features" involving fluorescent materials or polarizing stripes require that particular devices or conditions be available to detect the feature. Moreover, many of the features are expensive or specialized equipment, techniques or materials are required to install the feature in the finished card. In any event, there is a continuing need in the art for novel "verification features" which can provide laminated documents of improved overall security. This invention is addressed to that need and presents to the art improved laminated documents comprising a novel "verification feature" which closely conforms to the idealized performance characteristics desired for such features.

SUMMARY OF THE INVENTION

Broadly, the invention presents laminated documents having a novel "verification feature" provided by the integration of a phosphorescent material, preferably a pattern of a phosphorescent pigment material, with the elements of the laminate. The preferred laminated documents of the present invention are I.D. cards having the pattern integrated with a bond or seal existing between the protective plastic sheet or film and the card or document of the I.D. card. In the most preferred I.D. cards of the invention, the pattern is integrated with a bond or seal existing between a protective plastic sheet or film and the information-bearing surface of the card or document. The phosphorescent pigment materials employed in the practice of the present invention are those that emit visible radiation when exposed to radiation within the visible region of the electromagnetic spectrum and continue to emit visible radiation, at least for a short time, after such exposure.

The integration of a pattern of phosphorescent material with elements of laminated documents presents to the art laminated documents of improved security. The pattern provides a novel and effective "verification feature" for documents such as I.D. cards which is relatively inexpensive and can be integrated with I.D. cards with minimum inconvenience and without extensive modification of existing I.D. issuance systems or equipment or materials involved in producing I.D. cards. Moreover, the novel "verification feature" is one that cannot be effectively reproduced by photographic techniques, nor are specialized devices or conditions required to detect the feature. Finally, in the particularly preferred I.D. cards of this invention, the novel "verification feature" can cooperate with "security seals" to provide I.D. cards of particularly improved overall security.

The advantages of the invention as well as details relating to the practice of the invention will be better appreciated from the following detailed description taken in connection with the attached drawings.

DESCRIPTION OF THE PREFERRED EMBODIMENTS

As mentioned, the present invention broadly involves the integration of a phosphorescent material with laminated documents such as I.D. cards to provide a novel verification feature for them. Accordingly, in that broad sense, the phosphorescent material can be integrated with the card or document of the I.D. card such as by dispersing the material in or on at least one surface or surface layer of the card. Alternatively, the material could be integrated with a protective plastic sheet or film of the I.D. card by coating a pattern of the material on the plastic or by dispersing the material in the plastic and casting or forming sheets or layers with the plastic dispersion. Such embodiments, however, are not preferred. Instead, in the preferred embodiments of this invention, the phosphorescent material is integrated in the form of a predetermined pattern with a bond or seal existing between elements of the I.D. card. This preferred embodiment will be better appreciated by reference to the Figures and initially by reference to FIGS. 1 and 2.

Figures 1, 1A, 2, 3, 4:
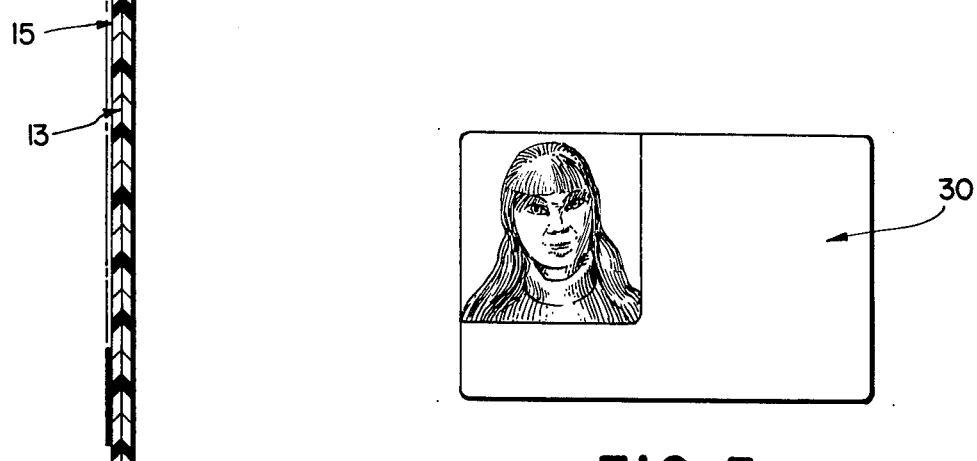
FIG. 1 is a plane view of a plastic sheet having a printed pattern of the "verification feature" of the present invention.
FIG. 1A is an enlargement of the printed pattern of FIG. 1.
FIG. 2 is a cross-sectional view of the sheet of FIG. 1 along lines 2—2.
FIG. 3 is a plane view of a preferred card or document used in the I.D. cards of the present invention.
FIGS. 4 and 5 are perspective views of I.D. card laminating assemblies or envelopes having the "verification feature" of the present invention.

FIGS. 1 and 2 illustrate a protective plastic laminar assembly for I.D. cards. The assembly shown as 10 comprises a plastic sheet 12 and an adhesive layer 14 having a printed pattern of a phosphorescent material 16 applied to surface 15 of adhesive layer 14 so that the pattern 16 can be integrated with a bond or seal existing between the plastic sheet and a card bonded to it. The application of pattern 16 to surface 15 of layer 14 is preferred but the integration of pattern 16 with a bond or seal existing between the card and a plastic sheet can also be achieved by coating or printing pattern 16 on surface 13 of sheet 12. Also, some plastic sheet materials have an inherent adhesive capability (polyvinyl chloride is an example) and in such instances, pattern 16 can be coated directly on a surface of such a sheet material. Accordingly, for the purposes of this invention the phrase "integrated with a bond or seal" can be broadly defined to include those instances where pattern 16 can be incorporated in or coated on an adhesive layer 14 or in a layer of the card or document or in the plastic sheet 12 bonded to the card by way of the adhesive layer(s). The preferred meaning of the phrase, however, defines those instances where pattern 16 is coated on the surfaces of the card or plastic bonded to each other or coated on a surface of the adhesive layer(s) bonding these elements together and particularly to those instances where pattern 16 is coated on the surface of the adhesive layer bonded to the surface of the card.

Plastic sheet 12 is shown as a transparent sheet, and is preferably used for lamination to the information-bearing surface of a card or document but it could be bonded to the opposite surface of the card. Sheet 12 may be made of any suitable rigid, semirigid or flexible plastic such as a cellulose acetate butyrate, a cellulose triacetate, a polyvinyl chloride, a polymerized polyethylene glycol ester, a polyolefin and/or the other plastics conventionally used in the fabrication of I.D. cards.

Adhesive layer 14 can be any suitable pressure-sensitive adhesive, moisture activatable adhesive or heat-activatable adhesive employed in the lamination of I.D. cards. Particularly preferred adhesives are those that can provide a "security seal" between plastic sheet 12 and the information-bearing surface of a card laminated to assembly 10. Especially preferred are those adhesives or adhesive systems that can provide a "security seal" at the time of lamination between plastic sheet 12 and a wet information-bearing surface of a diffusion transfer photograph which is the preferred card or document involved in the laminated documents of the present invention.

In the preferred practice of the invention, the phosphorescent material is applied to surface 15 of adhesive layer 14 in a predetermined printed pattern. This can be easily accomplished by dispersing the phosphorescent material in a suitable medium and applying the dispersion to the surface of layer 14 by known printing methods such as silk screening or gravure printing techniques. As already mentioned, the phosphorescent materials employed in the present invention are those that emit visible radiation when exposed to light and continue to emit radiation when no longer exposed. The continued emission (glowing) is best observed by removing the material to darker surroundings. Accordingly, suitable phosphorescent materials employed in this invention are commercially available phosphor pigments, but phosphorescent zinc sulfides which are relatively inexpensive and particularly effective are especially suitable.

The preferred dispersions for providing the printed patterns are those comprising a phosphorescent pigment material dispersed in a medium which, on drying can provide a matrix or binder for the printed pattern capable of effectively holding or adhering the pattern to adhesive layer 14. The matrix or binder providing material can comprise, for example, the same adhesive as the one used in adhesive layer 14 or a different adhesive. Particularly preferred matrix providing materials are those which can provide a matrix or binder for the pattern which is at least water swellable and preferably water soluble. Particularly preferred dispersions of phosphorescent materials are those that can provide printed patterns characterized by a visible discontinuity between closely packed pigment particles (or small numbers of them) of the pattern and the particles provide a pattern of discrete phosphorescent pigment particles dispersed in the materix material. Such a pattern is illustrated in FIG. 1A and such patterns are particularly preferred because they provide improved visibility of the pigment material with minimal obscuring of any information positioned below the pattern or below portions of the pattern.

The particle size of the phosphorescent pigment material is considered to be an important factor in providing the preferred patterns and dispersions comprising phosphorescent pigments having a particle size between about 2 to about 20 microns are suitable with those having a particle size between about 5–10 microns being preferred. Also, the phosphorescent material to binder ratio and the wetability of the phosphorescent material in the binder material are factors in providing the preferred pattern. For example, the phosphorescent material to binder ratio should be high and the binder should not completely wet the particle so that some air can remain associated with at least some portion of the pigment particle(s) so that an air interface may be provided between those portions of the particle and the binder material on coating or printing the pattern.

An especially suitable dispersion of phosphorescent material effectively used in the practice of this invention is as follows:

| DISPERSION A | |
|---|---|
| | Parts |
| Binder (2.8% Solution of Rohm & Haas ASE-60)[1] | 44.6 |
| Pigment (Glo-Pigment Series 1000)[2] | 50.0 |
| Water | 5.4 |
| Ammonia to bring pH to 9.0 | |

[1]Rohm & Haas ASE-60 is a commercially available emulsion of polyacrylic acid sold by Rohm & Haas, Inc.
[2]Glo-Pigment Series 1000 is a commercially available phosphorescent zinc sulfide sold by Conrad Hanoria, Inc.

The total solids of Dispersion A is about 41.25% and the dispersion is printed preferably by silk screen techniques. On drying, a printed pattern of Dispersion A comprises about 40 parts of phosphorescent material to about 1 part binder. A printed pattern having a high phosphorescent material to binder ratio, e.g., between about 20:1 to about 50 or 60:1, is preferred because such ratios provide efficient visibility of the pattern at low light levels.

As mentioned, the preferred card or document of I.D. cards of the present invention are diffusion transfer photographs which usually contain a photograph of the bearer together with photographic information relating to him or her. Diffusion transfer photographs are extensively used in I.D. card issuance systems and particularly in those systems known as "instant issuance" or "on-the-spot issuance" systems. In such systems, the intended bearer of the I.D. card presents himself or herself at an I.D. card issuance station where appropriate photographic and lamination materials and equipment are assembled. A data card containing information relating to the bearer is prepared and the bearer and data card are photographed simultaneously with a camera containing diffusion transfer photographic film. After processing, a transfer print (the card or document) is provided which comprises a suitable support carrying an image-bearing layer containing a photograph of the bearer and a photographic reproduction of the information on the data card. The image-bearing layer of the print is then laminated to a protective plastic sheet material and most often, the transfer print is laminated between two plastic sheets to provide the finished I.D. card.

"Instant issuance" systems or "on-the-spot issuance" systems are designed to provide an I.D. card for the intended bearer at the issuance station so that the I.D. card can be issued directly to the bearer for his or her immediate use. Normally with such systems, an I.D. card can be issued to the bearer within about fifteen minutes or less. This short issuance time, however, can pose problems insofar as the security of the issued I.D. card is concerned especially with respect to the bond achieved between the image-bearing layer of the print and a plastic adhered to it. As mentioned, the bond between the image-bearing layer and the plastic should be a "security seal" to prevent or discourage alteration and the "security seal" should be established or be operational before the card is actually issued to the bearer. The achievement of a "security seal" on lamination, or as shortly thereafter as possible, can be complicated by the presence of any moisture on the image-bearing layer as is the case with a freshly processed transfer print. With many adhesive systems, drying of the print is required in order to achieve an effective "security seal" and this drying time obviously interferes with the overall efficiency of such issuance systems. There are, however, certain adhesive systems that do provide an effective "security seal" between image-bearing layers of diffusion transfer prints and a plastic sheet material. These adhesive systems are described in the referenced Patents and Applications mentioned before and I.D. cards comprising a pattern of phosphorescent material integrated with such adhesives systems constitute the most preferred embodiments of this invention. These embodiments will be better appreciated by reference to FIGS. 3, 4 and 5.

FIG. 3 is a plane view of a diffusion transfer print which is particularly preferred as the card or document in the I.D. cards of the present invention. The print designated as 30 is obtained by exposing and processing Polaroid Type 108 Polacolor 2 Land film. Print 30 comprises an image-receiving layer containing photographic information relating to the bearer. The image-receiving layer of such prints comprises a mixture of polyvinyl alcohol and poly-4-vinyl pyridine. Covering the image-receiving layer is a stripping layer formed by coating a solution of ammonia and a hydrophilic colloid (usually gum arabic) on the image-receiving layer. Details relating to this overcoated stripping layer can be found in commonly assigned, copending Application Ser. No. 584,488 filed June 6, 1975. As those in the art know, diffusion transfer prints normally comprise, in addition to the image-receiving layer, neutralizing layers, timing layers and support layers, but these are not essential to the present invention and have not been shown.

FIG. 4 is a perspective view of an I.D. assembly envelope used in laminating a diffusion transfer print of FIG. 3 to provide I.D. cards of the present invention. The envelope designated as 23 comprises front plastic sheet member 24 coupled to back plastic sheet member 26 along edge 28. In constructing such an envelope, a front plastic sheet member 24 was prepared by contacting one surface of a cellulose triacetate sheet material (5 mils) with a 13% by weight sodium hydroxide solution for about 10 seconds at a temperature of about 120° F. and then drying the sheet material. A moisture activatable adhesive comprising 3.2 gms of Daratak 52L (55% solids), a low molecular weight polyvinyl acetate sold by W. R. Grace Company; 3.2 gms of Elvanol 90-50 (10% solids), a 99% hydrolyzed polyvinyl alcohol sold by E. I. DuPont de Nemours & Co., Inc.; 6.6 gms of methanol and 87.0 gms of water were applied to the hydrolyzed surface of the cellulose triacetate sheet material to provide an adhesive coating when dry of about 0.25 mils thickness. Using Dispersion A, a pattern of phosphorescent material 16 was printed on the moisture activatable adhesive layer in the form of a series of lines shown in the Figure. The printing was done by using a gravure roll.

Back sheet member 26 comprised a commercially available semirigid polyvinyl chloride containing a white pigment and having a pressure-sensitive adhesive on one surface. Back sheet member 26 was of approximately the same dimensions as front sheet member 24 and had a release sheet of polyethylene coated paper 32 over the pressure-sensitive layer leaving ⅛" to ¼" of the pressure-sensitive adhesive exposed along one edge.

Front member 24 and back member 26 were placed in superposition with the printed pattern 16 facing polyethylene coated paper 32 and pressure was applied to seal the exposed portion of the pressure-sensitive adhesive of back member 26 to the respective portion of front member 24 thereby providing sealing edge 28.

In lamination operations involving the lamination of a transfer print of FIG. 3 between the sheets of envelope 23, the moist image-bearing surface of a freshly processed transfer print is positioned against the printed pattern carrying adhesive layer of front sheet member 24. The polyethylene coated paper 32 (release sheet) is then stripped from the pressure-sensitive layer of back member 26, sheet members 24 and 26 and brought into superposition and the assembly is passed through a pair of pressure rollers for lamination to provide an assembled I.D. card of the type shown in FIG. 6.

Figure 5:
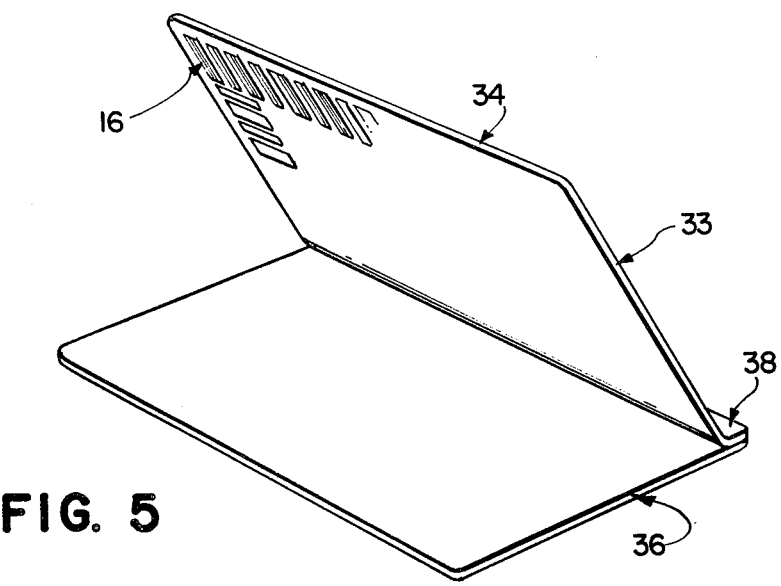

FIG. 5 illustrates an I.D. assembly envelope for producing heat laminated I.D. cards. The envelope designated as 33 comprises front plastic sheet member 34 coupled to back plastic sheet member 36 along edge 38. In constructing such an envelope, front plastic sheet member 34 was prepared using a commercially available clear polyester sheet having a layer of a heat-activatable adhesive comprising an ethylene-ethyl acrylate copolymer coated on the surface. An aqueous acidic (2% by volume) dispersion of 2:1 mixture polyvinyl alcohol: poly-4-vinyl pyridine (total solids 7%) was coated on the heat-activatable adhesive layer to provide a uniform coating when dry of about 0.8 mils thickness. The adhesive system of front sheet member 34 comprising the layer of heat-activatable adhesive and the layer of the mixture of polyvinyl alcohol and poly-4-vinyl pyridine provides an excellent "security seal" between the moist surface of a print and the sheet material on lamination. The pattern of phosphorescent material 16 was printed on the layer of the polyvinyl alcohol/poly-4-vinyl pyridine mixture in the manner described in the discussion of FIG. 4.

Back sheet member 36 comprised the same commercially available clear polyester sheet material, but the coating of polyvinyl alcohol/poly-4-vinyl pyridine was not applied to the heat-activatable adhesive layer. Front sheet member 34 was placed in superposition with back sheet member 36 with the layer of polyvinyl alcohol, poly-4-vinyl pyridine of member 34 facing the heat-activatable adhesive layer of member 36 and the members heat sealed together along an edge to provide sealing edge 38.

A transfer print of FIG. 3 is heat laminated in the envelope of FIG. 5 by separating the front and back members and positioning the moist information-bearing surface of a freshly processed print against the printed pattern carried by the adhesive system of front member 34. Front and back sheet members 34 and 36 are then brought into superposition and sufficient heat and pressure applied to the assembly in a platen press or by heated rollers to provide an assembled I.D. card of the type shown in FIG. 6.

It should be mentioned that if the information-bearing surface of the print is not moist, the layer of the mixture of polyvinyl alcohol and poly-4-vinyl pyridine need not be employed to achieve a "security seal" on lamination. An effective "security seal" between a dry surface of a diffusion transfer print and a polyester sheet material can be achieved by the heat-activatable adhesive layer of ethylene-ethyl acrylate copolymer alone. In such instances, the pattern of phosphorescent material would be printed on the surface of the copolymer layer to be bonded to the dry surface of the print.

Figure 6:
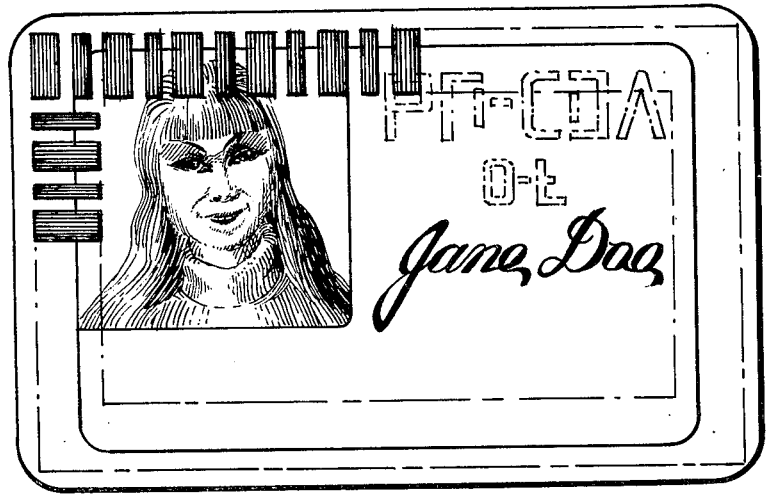
FIG. 6 is a plane view of an assembled I.D. card embodying a "verification feature" of the present invention.

The I.D. card of FIG. 6 illustrates I.D. cards that can be obtained by lamination of transfer prints in envelopes of the type shown in FIGS. 4 and 5. Each of the envelopes of the Figures has an adhesive system capable of providing a "security seal" and having a printed pattern of a phosphorescent material applied to such an adhesive system. As shown, the printed pattern comprises a pattern of alternating thin and thick lines, but patterns of letters, numbers or other designs or codes can be used. The particular design of the pattern employed is a factor that can improve the degree of security of the verification feature of this invention particularly if it is a coded design or so complicated or intricate that reproduction of the design would be discouraged. Preferably, the pattern should extend into the area occupied by the image-bearing surface so that some of the pattern is associated with the surface.

The phosphorescent character of the material of the pattern is a major factor contributing to the improved security of I.D. cards of the present invention. As mentioned, the phosphorescent material emits visible radiation in light and continues to emit (or glow) when removed from the light. Accordingly, verification of phosphorescent pattern can be readily established by exposing the card to light and removing the exposed card to darker surroundings. In daylight, for example, verification can be established by placing the I.D. card in a pocket, drawer or the like to view the glowing pattern. At night, verification can be established by shining a flashlight or headlight on the I.D. card and then shutting off the light or placing the I.D. card in a darker area. Specialized devices such as ultraviolet lights are therefore not required to detect the presence of the phosphorescent material. Moreover, the pattern cannot be effectively reproduced by photographic techniques since the reproduction will not exhibit the requisite phosphorescent activity.

As mentioned before, many phosphors are commercially available and can emit different colors and continue to emit radiation for different periods of time after they are removed from ambient light. Accordingly, the selection of particular phosphors or combinations of phosphors to provide predetermined characteristics is another factor that can be employed in the present invention to discourage would-be-counterfeiters.

The integration of the novel verification feature of the present invention with adhesive systems providing "security seals", especially those providing "security seals" between moist prints and plastic sheets, provides I.D. cards having special advantages. As mentioned, the "security seal" is an anti-alteration capability designed to destroy or remove portions of an information-bearing surface when an attempt is made to remove a plastic adhered to the surface. By integrating the printed pattern of phosphorescent material with an adhesive providing such a seal, the pattern can cooperate with the seal to provide improved security characteristics. For example, the front sheet members of I.D. cards employing the envelopes of FIGS. 4 and 5 can be sealed to the information-bearing surface of the transfer print by way of a "security seal". Under such circumstances, it would be very difficult to remove such sealed front members from the print with the pattern of phosphorescent material intact. Moreover, in the unlikely event that a front member is removed with the pattern intact, at least some portions of the information-bearing surface of the print should be adhered to the adhesive of the front member. Attempts to remove these adhered portions of the information-bearing surface could distort or destroy the pattern making the sheet member unuseable for further applications.

As shown in FIG. 6, the pattern of phosphorescent material is visible, but is should be understood that the pattern can be obscured. One way of obscuring such a pattern involves printing the pattern of phosphorescent material on the adhesive layer, for example, in the form of a series of numbers or letters or the like. The phosphorescent pattern can then be obscured by printing another pattern of a non-phosphorescent pigment of the same color as the phosphorescent material about or around the pattern of phosphorescent material. Such an obscured pattern could take the form of an opaque stripe appearing in the I.D. card with the phosphorescent pattern visible in the stripe when the I.D. card is removed from the light.

From the foregoing, it should be appreciated that the improved laminated documents of the present invention provide a distinctive and effective verification feature which can be integrated with the documents in a relatively simple, inexpensive and convenient fashion without extensive modifications of existing techniques and equipment. Moreover, the feature is sufficiently sophisticated to require specialized considerations and efforts on the part of a would-be-counterfeiter to defeat or duplicate it. Accordingly, the present invention presents a surprisingly effective solution to a need outstanding in the art; that of continuing to provide laminated documents such as I.D. cards of improved integrity and security.

Various modifications of features presented in the above-description which are offered for the purposes of illustrating the invention may be made without departing from the spirit and scope of the invention defined in the claims. For example, an I.D. card is obviously the preferred "laminated document" of the present invention, but the term "laminated document" also includes laminated birth certificates, laminated credit cards, laminated legal documents such as deeds, will, etc., laminated passports, laminated tickets, coupons or passes and similar documents. The installation of the novel verification feature with such other documents will be apparent from the above description of the particularly preferred embodiments of the invention.

What is claimed is:

1. A laminated document comprising a plastic sheet material bonded to an information-bearing document and a verification pattern of phosphorescent material integrated with the laminated elements.

2. A laminated document of claim 1 where the pattern comprises a matrix material which is water soluble.

3. A laminated document of claim 1 where the pattern comprises a matrix material which is water swellable.

4. A laminated document of claim 1 where the phosphorescent material is in the form of a printed pattern.

5. A laminated document of claim 4 where the phosphorescent material has a particle size between about 2 to about 20 microns.

6. A laminated document of claim 4 where the phosphorescent material has a particle size between about 2 to about 20 microns dispersed in a matrix material and the ratio of phosphorescent material to matrix material is between about 20:1 to about 60:1.

7. A laminated document of claim 1 where said pattern comprises a phosphorescent zinc sulfide.

8. A laminated document of claim 1 where the information-bearing surface of the document is bonded to the plastic sheet material.

9. A laminated document of claim 8 where the phosphorescent material is in the form of a printed pattern and the pattern is integrated with a bond existing between said document and said plastic sheet.

10. A laminated document of claim 9 where the bond existing between the document and plastic sheet is a security seal.

11. A laminated document of claim 10 where the security seal between the document and plastic sheet exists between the information-bearing surface of the document and the plastic sheet.

12. A laminated document of claim 11 where the document is a diffusion transfer print.

13. An I.D. card which comprises a diffusion transfer print as the information-bearing document of the I.D. card at least one surface of the print being bonded to a plastic sheet and a printed pattern of a phosphorescent material integrated with the bond existing between the document and the plastic sheet.

14. An I.D. card of claim 13 where the pattern comprises a matrix material which is water swellable.

15. An I.D. card of claim 13 where the pattern comprises a matrix material which is water soluble.

16. An I.D. card of claim 13 where the bond existing between the print and plastic sheet is a security seal.

17. An I.D. card of claim 13 where the phosphorescent material has a particle size between about 2 to about 20 microns.

18. An I.D. card of claim 17 where the phosphorescent material has a particle size between about 2 to about 20 microns dispersed in a matrix material and the ratio of phosphorescent material to matrix material is between about 20:1 to about 60:1.

19. An I.D. card of claim 13 where said pattern comprises a phosphorescent zinc sulfide.

20. An I.D. card of claim 16 where the security seal between the print and plastic sheet exists between the information-bearing surface of the print and the plastic sheet.

21. An I.D. card of claim 20 where the plastic sheet comprises a sheet of cellulose triacetate with a hydrolyzed surface said surface being bonded to the information-bearing surface of the print by an adhesive layer comprising a mixture of a low molecular weight polyvinyl acetate and a hydrolyzed polyvinyl alcohol and where the pattern of phosphorescent material is printed on that surface of said adhesive layer opposite said surface of the print 22. An I.D. card of claim 20 where the plastic sheet comprises a polyester sheet material which is bonded to the information-bearing surface of the print by a layer comprising an ethylene-ethyl acrylate copolymer and where the pattern of phosphorescent material is printed on the surface of the copolymer layer opposite said surface of the print.

23. An I.D. card of claim 20 where the plastic sheet comprises a polyester sheet material which is bonded to the information-bearing surface of the print by an adhesive system comprising a layer of an ethylene-ethyl acrylate copolymer coated on a surface of the polyester sheet material and a layer of a mixture of a polyvinyl alcohol and a polyvinyl pyridine coated on the copolymer layer and where the pattern of phosphorescent material is printed on the layer of the mixture of a polyvinyl alcohol and a polyvinyl pyridine.

24. An I.D. card which comprises a laminate including in order, a sheet of cellulose triacetate having a hydrolyzed surface, an adhesive layer comprising a mixture of a low molecular weight polyvinyl acetate and a hydrolyzed polyvinyl alcohol coated on the hydrolyzed surface, a pattern of phophorescent material having a particle size between about 2 to about 20 microns printed on said adhesive layer said pattern comprising a matrix material which is water swellable or water soluble and a diffusion transfer print with the information-bearing surface of the print bonded to said adhesive layer and the phosphorescent material.

25. An I.D. card which comprises a laminate including in order, a polyester sheet material, an adhesive layer comprising an ethylene-ethyl acrylate copolymer, a pattern of a phosphorescent material having a particle size between about 2 to about 20 microns printed on the adhesive layer said pattern comprising a matrix material which is water swellable or water soluble and a diffusion transfer print with the information-bearing surface of the print bonded to the adhesive layer and the phosphorescent material.

26. An I.D. card which comprises a laminate including in order, a polyester sheet material, an adhesive system comprising a layer of an ethylene-ethyl acrylate copolymer coated on the polyester sheet material and a layer of a mixture of a polyvinyl alcohol and a polyvinyl pyridine coated on the copolymer layer, a pattern of a phophorescent material having a particle size between about 2 to about 20 microns printed on the layer of the mixture said pattern comprising a matrix material which is water swellable or water soluble and a diffusion transfer print with the information-bearing surface of the print bonded to said adhesive system and the phosphorescent material.

27. A laminated document of claim 1 wherein said plastic sheet material bonded to said information-bearing document comprises an envelope of front and back plastic sheet members having approximately the same dimensions and wherein the information-bearing document is bonded therebetween such that the information-bearing surface of the document is bonded to said front plastic sheet member.

28. An I.D. card of claim 13 wherein said plastic sheet bonded to said print surface comprises the front sheet member of an envelope comprising front and back plastic sheet members having approximately the same dimensions and wherein said diffusion transfer print is bonded between the front and the front and back sheet members of said envelope.

* * * * *